(12) United States Patent
McEwan

(10) Patent No.: US 6,462,705 B1
(45) Date of Patent: Oct. 8, 2002

(54) SPREAD SPECTRUM RADAR CLOCK

(75) Inventor: Thomas E. McEwan, Carmel Highlands, CA (US)

(73) Assignee: McEwan Technologies, LLC, Monterey, CA (US)

( * ) Notice: Subject to any disclaimer, the term of this patent is extended or adjusted under 35 U.S.C. 154(b) by 0 days.

(21) Appl. No.: 09/641,115

(22) Filed: Aug. 17, 2000

(51) Int. Cl.$^7$ .............................. G01S 7/28; G01S 13/00
(52) U.S. Cl. ..................... 342/175; 342/118; 342/124; 342/134; 367/99; 356/4.01; 356/5.01
(58) Field of Search ................... 342/175, 195, 342/202, 203, 204, 120–144, 118, 119; 367/87, 88, 89, 90, 91, 92, 93, 94, 99, 100, 101, 102, 103, 104, 105; 356/3, 4.01, 5.01, 5.02–5.08, 27, 28, 28.5

(56) References Cited

U.S. PATENT DOCUMENTS

| | | | |
|---|---|---|---|
| 3,117,317 A | * | 1/1964 | Kenyon ..................... 342/134 |
| 3,514,777 A | * | 5/1970 | Woerrlein ................... 342/129 |
| 4,132,991 A | | 1/1979 | Wocher et al. |
| 4,507,796 A | | 3/1985 | Stumfall |
| 4,639,932 A | | 1/1987 | Schiff |
| 5,363,108 A | | 11/1994 | Fullerton |
| 5,563,605 A | | 10/1996 | McEwan |
| 5,610,955 A | | 3/1997 | Bland |
| 5,631,920 A | | 5/1997 | Hardin |
| 5,745,437 A | * | 4/1998 | Wachter et al. ............. 367/100 |
| 5,781,074 A | | 7/1998 | Nguyen et al. |
| 5,872,807 A | | 2/1999 | Booth et al. |
| 6,055,287 A | | 4/2000 | McEwan |
| 6,072,427 A | | 6/2000 | McEwan |

* cited by examiner

Primary Examiner—Bernarr E. Gregory
(74) Attorney, Agent, or Firm—Mark A. Haynes; Haynes Beffel & Wolfeld LLP

(57) ABSTRACT

A dither oscillator randomly modulates the instantaneous phase of a precision radar PRF oscillator. Radar spectral emission lines occurring at multiples of a transmit PRF oscillator are spread by the phase modulation, resulting in a continuous noise-like spectrum for reduced interference. The dither oscillator is based on a CMOS logic inverter and has adjustable coherence. The transition times of the PRF clock are decreased to 100 ps using negative resistance in an emitter follower to help injection-lock an RF oscillator to the PRF clock. Applications include spread-spectrum radar sensors operating in the crowded ISM bands, such as robotic and automotive pulse-echo rangefinders.

17 Claims, 6 Drawing Sheets

SPREAD SPECTRUM RADAR CLOCK

BACKGROUND OF THE INVENTION

1. Field of the Invention

The present invention relates to timing circuits, and more particularly to precision, dithered phase, swept delay circuits. A particular application is radar timing circuits including precision swept delay circuits for equivalent time ranging systems. It can be used to generate a spread-spectrum swept-delay clock for sampling-type radar, laser and TDR systems, as well as radio and ultrasonic systems.

2. Description of Related Art

High-resolution pulse-echo systems such as wideband pulsed radar, pulsed laser rangefinders, and time domain reflectometers (TDR) generally sweep a timing circuit across a range of delays. The timing circuit controls a receiver sampling gate such that when an echo signal coincides with the temporal location of the sampling gate, a sampled echo signal is obtained in accordance with well-known equivalent time sampling techniques. The echo range is then determined from the timing circuit, so highly accurate swept timing is needed to obtain accurate range measurements. Unfortunately, highly accurate timing implies a very accurate and highly periodic radar pulse repetition frequency PRF, which creates an RF line spectrum. Narrowband or CW RF interference creates beat frequency interference when close to a spectral line. However, if there are no spectral lines due to spectrum spreading, then beat frequencies cannot occur.

One prior art approach to precision swept timing is a delay locked loop (DLL), wherein the delay between a transmit and receive clock is measured and controlled. Examples of DLL architectures are disclosed in U.S. Pat. No. 5,563,605, "Precision Digital Pulse Phase Generator" by McEwan, and in U.S. Pat. No. 6,055,287, "Phase-Comparator-Less Delay Locked Loop" by McEwan. Both of these DLL approaches employ a single highly periodic precision crystal oscillator as the time base. Neither patent discloses a means to spread the spectrum of a radar signal.

A second prior art approach to precision timing uses two oscillators with frequencies $F_T$ and $F_R$ that are offset by a small amount $F_T - F_R = \Delta$. In a radar application, a first oscillator at frequency $F_T$ triggers transmit RF pulses, and a second oscillator at frequency $F_R$ triggers a sampling gate for the echo RF pulses. Due to the small frequency difference $\Delta$, the timing of the sampling gate smoothly and linearly slips in phase (i.e., time) relative to the transmit clock such that one full cycle is slipped every $1/\Delta$ seconds. The slow phase slip creates a time expansion effect of $F_T/\Delta$ (~100,000 typically). Due to the expansion effect, events on a picosecond scale are converted to an easily measurable microsecond scale.

This two-oscillator technique was used in the 1960's in precision time-interval counters with sub-nanosecond resolution, and appeared in a short-range radar in U.S. Pat. No. 4,132,991, "Method and Apparatus Utilizing Time-Expanded Pulse Sequences for Distance Measurement in a Radar," issued in 1979 to Wocher et al. Copending application, "Self Locking Dual Frequency Clock System" Ser. No. 09/182,947, filed Apr. 1, 1999, now U.S. Pat. No. 6,373,428, by McEwan, and U.S. Pat. No. 6,072,427, "Precision Radar Time Base Using Harmonically Related Offset Oscillators" by McEwan describe improvements to the two-oscillator technique. Both oscillators in a two-oscillator system are highly periodic precision crystal oscillators having a sharp line spectrum.

A common approach to spreading the line spectrum of a signal is to apply modulation to a steady clock signal after it is generated by a precision oscillator. Modulation formats include bi-phase and quad-phase, often at a high chip rate. U.S. Pat. No. 5,363,108 "Time Domain Radio Transmission System," by Fullerton shows a clock followed by a stepped phase shifter. However, if the clock phase is uniformly stepped, rather than randomly stepped, a frequency shift will result without spreading the spectrum (serrodyne modulation).

While spread spectrum systems abound, particularly in communications, none address the area of phase dithered picosecond accurate single or dual clocks for sampling type radar systems. The prior art does not disclose a means to spread the spectrum of a precision oscillator itself.

SUMMARY OF THE INVENTION

The present invention is a randomly phase modulated precise clock system for pulsed radio, radar, laser, ultrasonic, and TDR ranging systems (and other timing applications which need an offset frequency) requiring high stability and accuracy, and a transmitter-receiver system incorporating the clock system. Several embodiments include but not limited to: (1) a single oscillator DLL system and (2) a two oscillator system. A fundamental problem solved is how to wideband modulate a crystal oscillator having a narrowband high Q resonator (the crystal) which exhibits a very narrowband characteristic (typical crystal bandwidth=100 Hz). Broadband modulation of the oscillator is accomplished by placing the crystal in a feedback path while injecting the broadband modulation in a forward path, where it appears as broadband phase modulation at the oscillator output. In the dual oscillator system, broadband phase modulation is applied equally to both transmit and receive oscillators so the deleterious effect of timing jitter introduced by the common phase modulation cancels.

A unique noise source is disclosed herein: a single CMOS oscillator is configured as a starved voltage oscillator to produce exceedingly noisy oscillations, which are used as a dither signal. In addition, the digital dither signal is wave-shaped and injected into the crystal oscillator(s) via a coupling network.

The majority of applications for the timing system described herein employ RF burst oscillators which must be phase locked, i.e., injection locked, to the clock signals. In other words, the RF oscillators must start with exactly the same RF phase on each repetition of the PRF clock. To aide in injection locking—a form of shock excitation—negative emitter impedance is used to speed the edges of the clock signals.

A primary object of the present invention is to provide a high accuracy spread-spectrum swept timing circuit for time-of-flight ranging systems.

A further object of the present invention is to reduce interference to and from other RF systems sharing the same frequency band.

Yet another object of the present invention is to provide improved injection locking of RF oscillators needing precisely timed and phased startups.

Applications include low cost spread-spectrum radars for security alarms, home automation and lighting control, industrial and robotic controls, automatic toilet and faucet control, automatic door openers, fluid level sensing radars, imaging radars, vehicle backup and collision warning radars, and universal object/obstacle detection and ranging. One specific embodiment utilizing the present invention is a time domain reflectometer (TDR) where a pulse is propagated along a conductor or guidewire to reflect from a material for use in a variety of applications, such as an "electronic dipstick" for fluid level sensing. The single rod electronic dipstick (Goubau line) has an obvious need for spread spectrum timing since the rod is essentially an antenna and is thus susceptible to interference.

DETAILED DESCRIPTION OF THE INVENTION

A detailed description of the present invention is provided below with reference to the figures. While illustrative component values and circuit parameters are given, other embodiments can be constructed with other component values and circuit parameters. All U.S. Patents and copending U.S. applications cited herein are herein incorporated by reference.

Figure 1A:
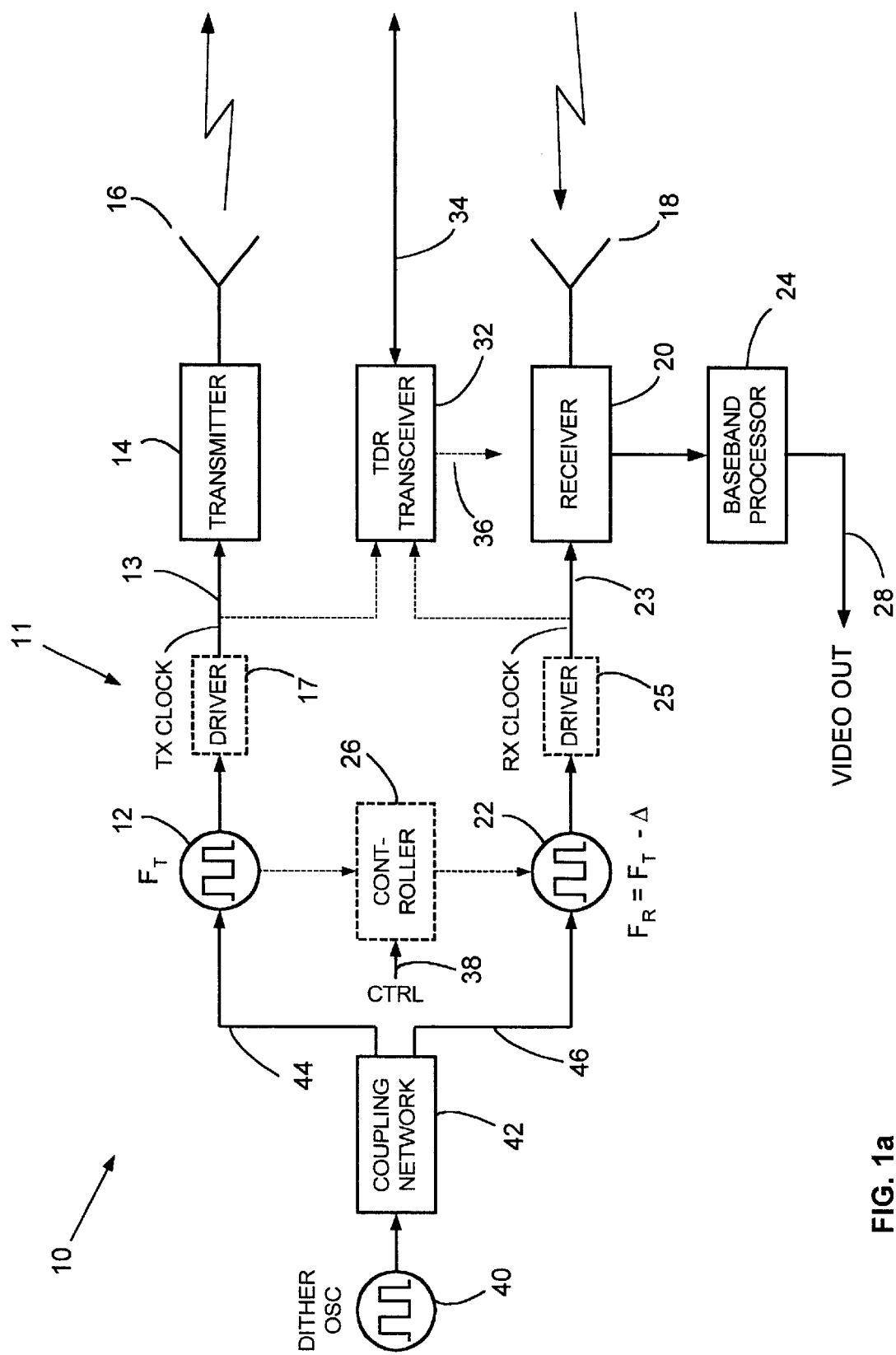
FIG. 1a is a block diagram of a spread spectrum transmitter-receiver or transceiver system employing phase modulated transmit (TX) and receive (RX) clock oscillators of the present invention.

FIG. 1a shows a general spread-spectrum pulsed transmitter-receiver or transceiver system 10 based on a phase modulated two-oscillator timing system 11 of the present invention. A transmit clock oscillator 12 produces transmit clock pulses on TX CLOCK line 13 to drive a transmitter 14 which may be part of an impulse radar, a pulsed RF radar, a pulsed laser, a pulsed radio, or even a pulsed ultrasonic source. The output of TX CLOCK oscillator 12 may pass through an optional driver to form TX CLOCK pulse on line 13. Thus, oscillator 12 alone or in combination with driver 17 forms the TX CLOCK (or PRF generator). The transmitter 14 is coupled to a transducer 16 for radiation into a propagating medium. The transducer 16 may be an antenna, a laser diode and lens, or an acoustic transducer.

A receive transducer 18 receives echoes of signals radiated by transducer 16 and couples electrical pulses to a receiver 20, which is a gated, sampling type receiver, such as that described in U.S. Pat. No. 6,060,915, "Charge Transfer Wideband Sample-Hold Circuit", by McEwan. The gate pulses to receiver 20 are obtained from receive clock oscillator 22 via RX CLOCK line 23 and an optional driver 25 may be added between RX oscillator 22 and line 23. Thus oscillator 22 alone or in combination with driver 25 forms the RX CLOCK.

Optional drivers 17, 25 speed the transition times of the TX and RX clock signals to help maintain tight phase coherence between the TX and RX CLOCKs and the RF circuitry in transmitter 14 and receiver 20.

Receiver 20 outputs individual samples, or a number of integrated samples, to a baseband processor 24 which generally contains amplifiers, filters, and other elements common to equivalent time receivers, such as disclosed in copending application, "Precision Short-Range Pulse-Echo Systems With Automatic Pulse Detectors", Ser. No. 09/120,994, filed Jul. 22, 1998, now U.S. Pat. No. 6,137,438, by McEwan. The processor output generally includes an equivalent time analog replica of the RF, optical or acoustic echo, i.e., the VIDEO OUT signal on line 28

Optionally, a time domain reflectometer (TDR) configuration of FIG. 1a may be utilized, wherein transmitter 14 and receiver 20 and their corresponding transducers 16, 18 are replaced with a TDR transceiver 32 with its output 36 connected to baseband processor 24. The TX CLOCK and RX CLOCK signals from drivers 17, 25 (or oscillators 12, 22 if there are no drivers) are input to TDR transceiver 32. The TDR transceiver 32 is connected to a transmission line 34 to determine the location of discontinuities in the transmission line impedance by measuring the time delay to a reflection from the discontinuity. A common application for the TDR configuration is an "electronic dipstick" wherein the cable may be a single wire transmission line inserted into a liquid in a tank, such as a gas tank on an automobile.

One of the two clock oscillators 12, 22 is offset from the other by an amount Δ to allow for a phase slippage. Timing system 11 may optionally include a phase lock loop (PLL) or other type of controller 26 connected between the TX oscillator 12 and RX oscillator 22 and responsive to a reference signal from control input CTRL on line 38. Generally, the first (transmit) clock oscillator 12 is set to a precise frequency $F_T$ and the second (receive) clock oscillator 22 is locked to a desired offset frequency Δ ($F_R$=N$F_T$−Δ), N=1,2,3 . . .

Alternatively, the transmit elements 12, 14, and 16 may be spaced away from the receive elements 18, 20, 22, 24 and 26 to form either a monostatic or bistatic transceiver or radar system, or a radio system (one-way transmission).

Dither oscillator 40 generates an extremely noisy oscillation, typically with an average period of 2 microseconds and a jitter of about +/−25% of its period. Coupling network 42 shapes the digital waveform from the dither oscillator and couples it through line 44, 46 to the clock oscillators to create random phase modulation of the TX and RX CLOCK signals. It is essential that both the TX and RX CLOCK signals are phase modulated by the same amount. Typically, the TX and RX CLOCKs operate at 5 MHz and are dithered only a few percent of their periods. Whatever the dither, or phase modulation percentage is, it must be the same for both the TX and RX CLOCKs.

Figure 1B:
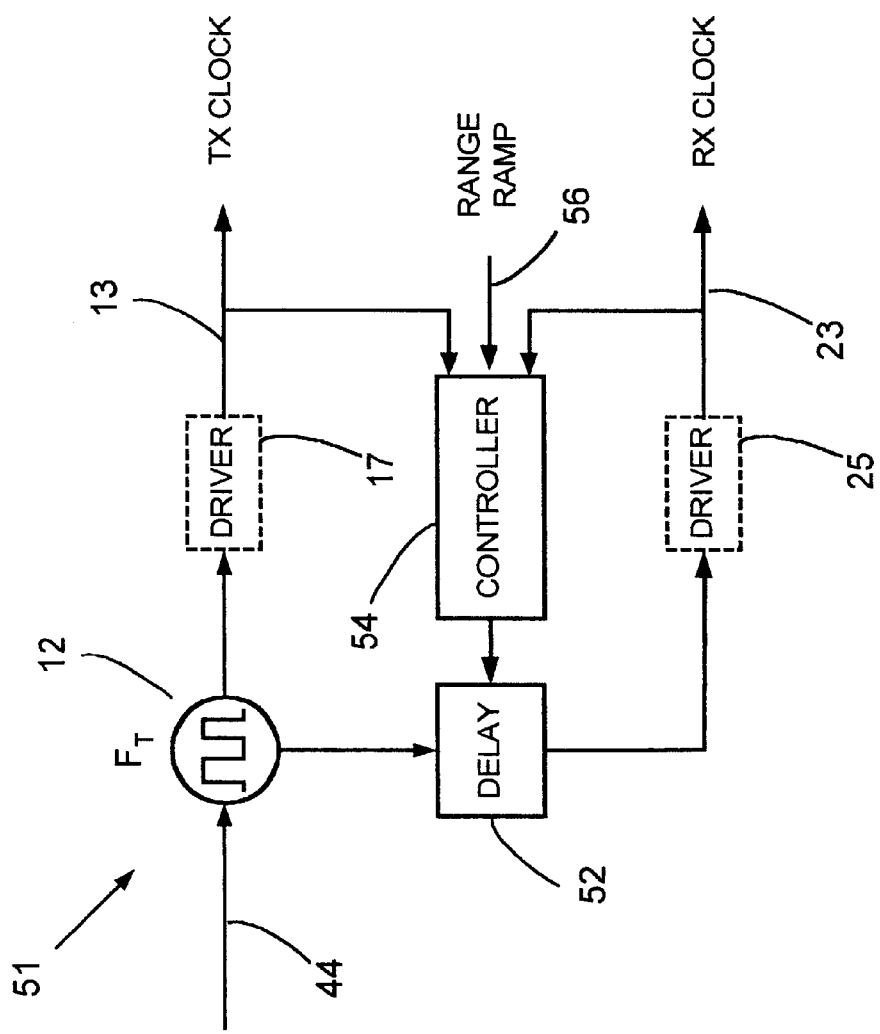
FIG. 1b is a block diagram of a Delay Locked Loop (DLL) timing system of the present invention.

FIG. 1b shows an alternative timing system 51 to timing system 11 of FIG. 1a. Delay Locked Loop (DLL) controller 54 converts the phase between the TX and RX CLOCK signals on lines 13, 23 to a voltage and compares that voltage to a RANGE RAMP voltage on line 56 and adjusts delay 52 to bring controller 54 into equilibrium, thereby accurately setting the relative TX-RX CLOCK signal delay, or phase, according to the RANGE RAMP control input. The DLL timing system has only one clock oscillator 12, which receives phase modulation via line 44 as in FIG. 1a. The output of clock oscillator produces the TX CLOCK signal and also passes through delay 52 to produce the RX CLOCK signal. Drivers 17, 25 may also be included.

FIG. 2 is a detailed schematic diagram of a two-oscillator spread spectrum timing system 70 of the present invention. A first crystal clock oscillator 12 typically oscillates at a frequency $F_T$=5.000000 MHz. It is based on a CMOS logic inverter. Its output is coupled through a second inverter to driver circuit 17, which provides a TX CLOCK squarewave output 100 on line 13 to trigger a transmitter.

A second crystal clock oscillator 22, based on CMOS logic inverter U4a and crystal RX OSC, operates at a small offset $\Delta$, or typically 5.000000 MHz–100 Hz. Its output is coupled through a second inverter 73 and line 75 to driver circuit 25, which provides a RX CLOCK squarewave output 170 on line 23 to trigger a receiver gate. Inverters U3a and U4a are more generally gain elements.

Dither oscillator 80 is comprised of logic inverter U1a, feedback resistor Rf and input bypass capacitor Cf. The period of oscillation roughly scales with RfCf and bias resistor Rb. Rf provides negative DC feedback around the inverter and ensures the inverter self-biases in its linear region, on average. Oscillations occur due to the extremely high gain provided by the inverter ~$10^6$, and a slight phase shift at the oscillation frequency. With such high gain, network RfCf can attenuate the feedback to a great extent, so the oscillation feedback is small and the input noise of the inverter becomes significant. To enhance noise and phase shift, inverter U1a is operated at a much reduced voltage, ~1.25V, compared to its normal 5-volt rating. It is well known that reducing the supply voltage of a CMOS totem pole inverter stage has little effect on its gain since its output impedance increases in the same proportion as its transconductance decreases. Thus at reduced supply voltage, the gain remains very high, but circuit resistance increases, leading to increased noise and phase shift. Resistor Rb provides a nearly constant current to inverter U1a and allows the supply voltage at the power pin 82 to quiescent at a self regulating point that is substantially independent of CMOS process parameters. Capacitor Cb provides high frequency bypassing. However, Cb must be larger than ordinary due to a tendency for low frequency oscillations to occur. Inverter U1b buffers U1a and helps prevent reverse contamination of the noisy oscillations provided by U1a from the oscillations of U3a.

Inverter U2a forms an AC coupled level translator, which receives 0 to 1.25V logic swings from U1b and outputs 0 to 5V logic swings on line 76. Resistor Rx across U2a is a high-value resistor, typically 1 M$\Omega$, which maintains U2a at its logic input threshold, on average, for maximum noise margin. The time constant RxCx is large compared to the signal being passed.

Coupling network 84 is comprised of integrator RnCn and tuning/coupling capacitor Ct. Two networks are shown for the two-oscillator timing system 11 of FIG. 1a. For a single oscillator timing system 51 of FIG. 1b, only one network 84 is used. Resistor-capacitor integrator RnCn converts the 5-volt noisy squarewave from U2a into a noisy triangle wave for linearly sweeping the phase, or timing jitter, of oscillators 12 and 22. Coupling capacitor Ct is also a frequency tuning capacitor for oscillators 12 and 22. Alternative injection means might use a resistor in place of Ct. However, in most applications it is essential that the noise spectrum lie above the signal spectrum of the overall system. Thus high pass filtering of the injected noise is desirable and is accomplished via the use of a small injection capacitor Ct.

PRF clock oscillators 12 and 22 employ bypassed DC coupled feedback networks R1, R2, and C1 to maintain inverters U3a and U4a in their linear regions, on average. Capacitor C1 bypasses high frequency currents from the inverter output to ground. This helps the highpass filtering effect provided by Ct, reducing low frequency phase modulation.

Instantaneous phase modulation occurs in oscillators 12 and 22 by modulating the net voltage at the inputs to inverters U3a and U4a and thereby the exact time of logic threshold switching. The signal at the inverter input is normally a 5 volt 5 MHz sinusoid, for 5 MHz crystals, plus or minus a small noisy triangle wave provided by RnCn. Thus, the output inverters U3a and U4a are noise modulated in phase.

Emitter follower Q1 (and Q2) accepts a 5 MHz clock squarewave signal from inverter 72 (or 73) via a base inductor Lb and outputs a ~4-volt squarewave signal from its emitter. The transition times of the output are ~3× faster than its input. To some extent the transition times are faster because the emitter follower is turned off when the input is zero and doesn't respond until the input reaches ~0.7V. However, that is only a small contributor to the speed-up effect. The major contributor is negative impedance in the emitter circuit. Emitter resistor Re determines the emitter current.

Negative impedance in an emitter follower can be explained as follows. The current gain $\beta$ of a transistor rolls off above a cutoff frequency $F_\beta$. As with any first order roll-off, there is a 90-degree phase shift beyond cutoff. Typically, $F_\beta$=100 MHz for a 6 GHz gain bandwidth transistor having a $\beta$=60. Thus, all frequencies about 100 MHz experience a ~90-degree phase shift regarding emitter current. While the current is shifted 90 degrees, the input-output voltage of an emitter follower does not shift in phase. If an inductance is placed in series with the base of an emitter follower to provide 90 degrees phase shift via its reactance, the net phase shift seen in the emitter would be 90 degrees from the inductance and 90 degrees from the $\beta$-rolloff, for a total of 180 degrees phase shift regarding emitter current, which produces a negative impedance effect. This effect has been described in textbooks and will not be elaborated on here, except to describe its unique application in this invention.

Inverter 72 drives the emitter follower with very fast transition, which has spectral components above 100 MHz and thus involves the negative impedance effect. Normally this effect produces unwanted ringing or oscillations in emitter followers. In this case, the effect is used to speed the edges of the clock signals. Negative impedance effectively provides positive feedback, speeding the transitions.

To prevent overshoot and ringing caused by inductor Lb and parasitic capacitance, the collector of Q1 is operated at a voltage close to the maximum voltage appearing at the emitter of Q1. Thus, overshoot in the emitter is clamped by base-collector conduction, which clamps the base voltage and thereby prevents overshoot and ringing in the emitter circuit. Accordingly, the collector is bypassed with capacitor Cc, which charges to a maximum voltage via base-collector conduction. The collector voltage could be provided by a power supply or other bias network, but practical experience has shown that self-biasing via base collector conduction provides an optimum bias voltage for clamping action. It should be noted that inverter 72 has a very low output impedance, ~12Ω, and is thus capable of driving this configuration.

Figure 2A:
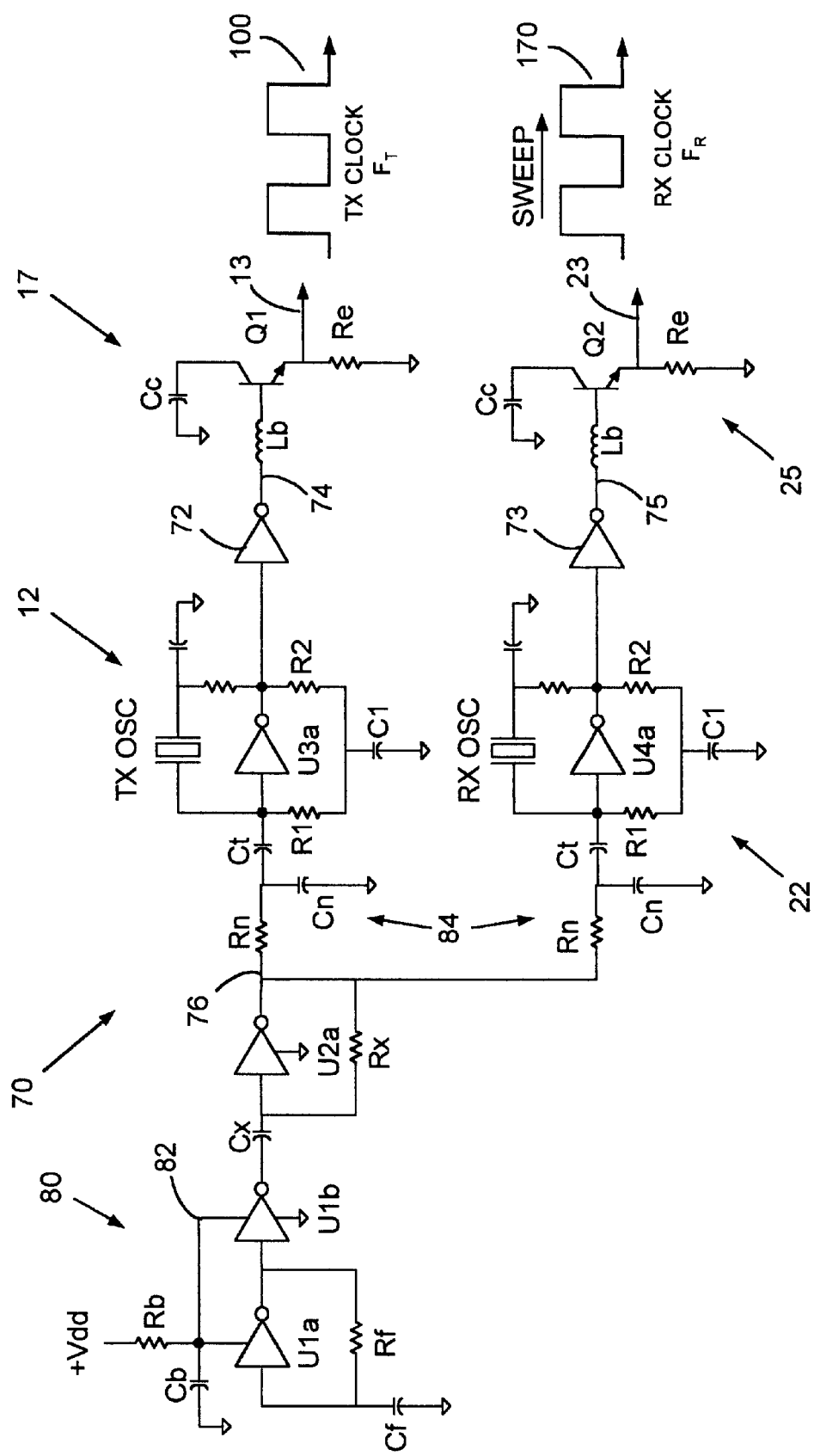
FIG. 2a is a schematic diagram of a two-oscillator embodiment of the present invention.
Figure 2B:
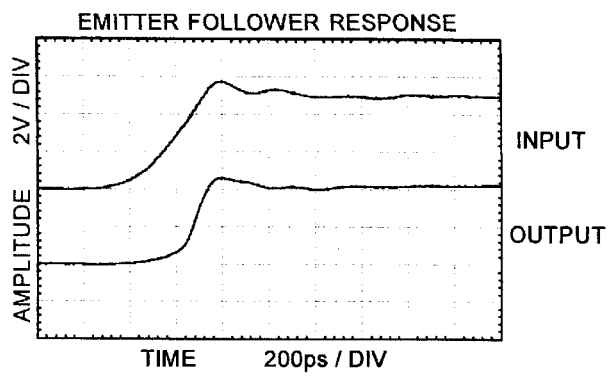
FIG. 2b is an oscillograph of the transient response of the emitter follower driver circuit of the FIG. 2a system.

FIG. 2b plots an input waveform (upper trace) to drive circuit 17, i.e., emitter follower circuit Q1, which appears on line 74 of FIG. 2a and the resulting response (lower trace) appearing at the emitter of Q1. The input transition time is about 300 ps and the output response is ~3× faster, or ~100 ps.

Inverters U1–U4=74AC04, Q1, Q2=NEC NE68533, Rb=33 k, Rf=Rx=1M, R1=R2=10 k, Re=470, Cf=Cx=Cn=1000 p, Ct=33 p, Cc=0.01 u, in an illustrative embodiment.

Figure 3A:
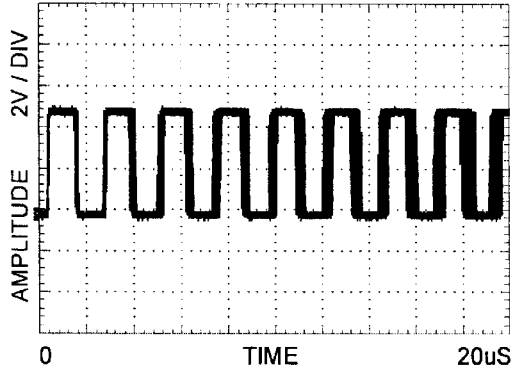
FIGS. 3a and 3b are plots of dither oscillator waveforms produced by the dither oscillator circuit of FIG. 2a for two bias resistor Rb settings.

FIG. 3a plots the dither oscillator output on line 76 of FIG. 2a for bias resistor Rb=60 kΩ. The first cycle after triggering the oscilloscope appears on the left and has the least amount of timing jitter. As the plot progresses to the right the timing jitter increases due to the increase in jitter across a larger time span.

Figure 3B:
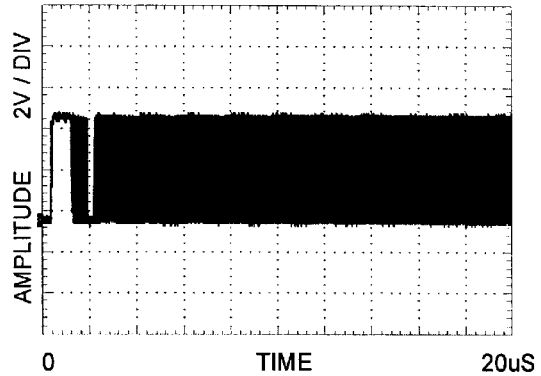

FIG. 3b shows the impact of increasing Rb to 80 kΩ. Now the jitter on the first cycle is about 25% of the period. After the second cycle, the jitter completely smears across the waveform. Both FIGS. 3a and 3b are overlays of hundreds of waveform repetitions to show the variation, i.e., the timing jitter.

Figure 3C:
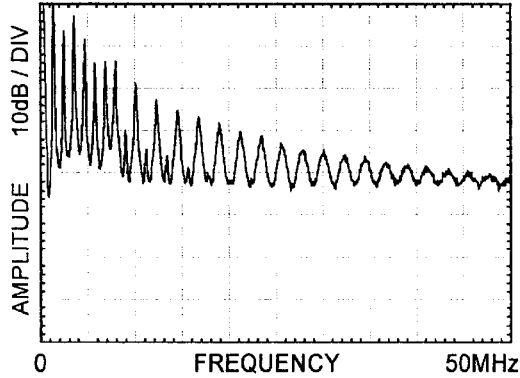
FIGS. 3c and 3d are plots of the associated spectra to the FIGS. 3a and 3b waveforms, respectively.

FIG. 3c is a spectrum plot of the waveform of FIG. 3a. The spectrum is noisy with some line structure is still visible. At 50 MHz, i.e., the ~$100^{th}$ harmonic, the line structure has almost disappeared. Since this oscillator phase modulates a PRF clock oscillator 12, it is best to eliminate the spectral lines to facilitate a pure noise-like RF emission spectrum from transmitter 14.

Figure 3D:
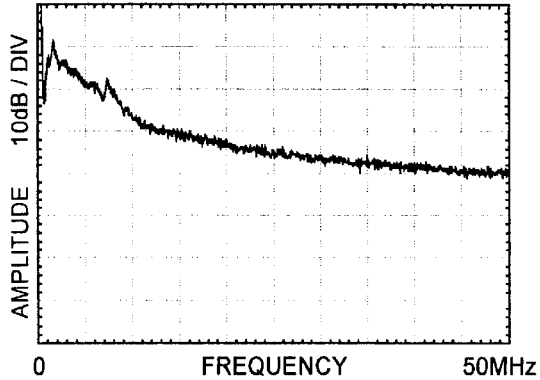

FIG. 3d is a spectrum plot of the waveform of FIG. 3b. The spectrum is smooth, which indicates a pure, white noise source. It rolls off with increasing frequency since it results from a squarewave rather than an impulse train, which would not roll-off. Transmitter 14 and receiver 20 generally require squarewave clock signals.

Figure 4A:
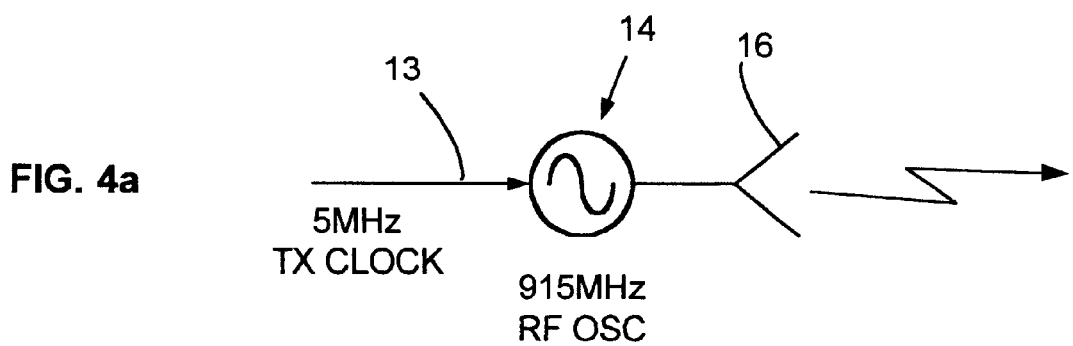
FIG. 4a depicts a pulsed RF transmitter of the present invention.

FIG. 4a is a sketch of a 915 MHz pulsed-RF embodiment of transmitter 14 and antenna 16. A 5 MHz TX CLOCK signal is provided on line 13.

Figure 4B:
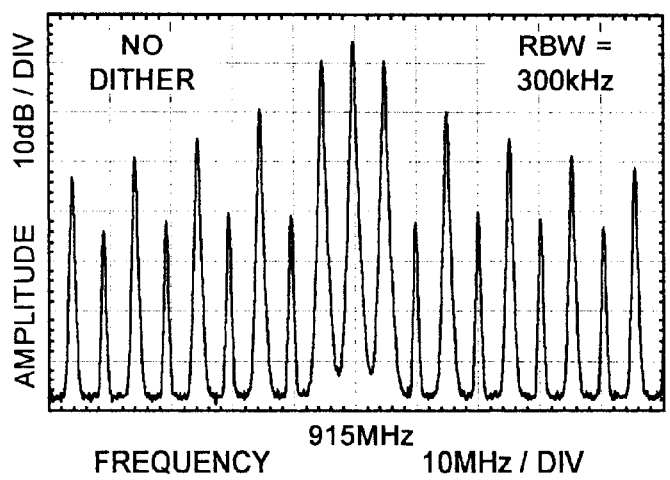
FIG. 4b is an RF emission spectrum without dithered phase modulation.

FIG. 4b is a spectral plot showing a line spectrum centered at 915 MHz and with 5 MHz line spacing, which equals the TX CLOCK signal frequency. Spectral lines are present because dither oscillator 40 has been removed for illustration.

Figure 4C:
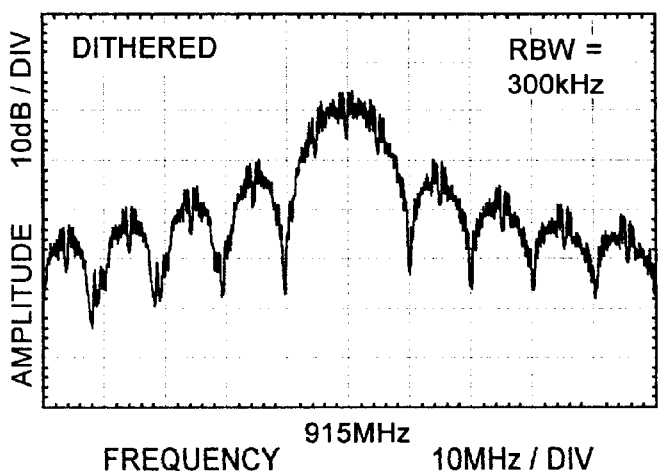
FIG. 4c is an RF emission spectrum with dithered phase modulation.

FIG. 4c is a spectral plot with the dither oscillator applied. Spectral lines are no longer present and the signal appears to be smoothly noise modulated with nulls occurring at 1/PW about the center frequency, where PW=RF pulse width=100 ns. The peak amplitude of the dithered spectrum is about −12 dB below the peak amplitude of the line spectrum. This decrease in spectral amplitude due to dithering is desirable for reduced interference to other spectrum users and can be approximated by A~10 log(RBW/PRF), where RBW is the resolution bandwidth of the spectrum analyzer (or any receiver)=300 kHz, and PRF is the TX CLOCK rate=5 MHz. For a cell phone having a receiver bandwidth of 10 kHz, A=10 log(10 kHz/5 MHz)=−27 dB.

Figure 5A:
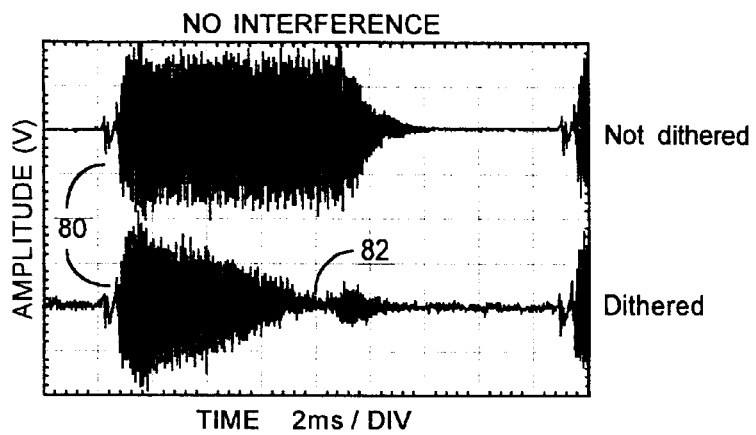
FIG. 5a plots sampled 915 MHz RF bursts for dithered and non-dithered clock signals.

FIG. 5a plots the response of a 915 MHz embodiment of FIG. 1a for a sampled squarewave 915 MHz RF burst without dithering (upper trace) and with dithering (lower trace). With dithering, the squarewave burst is converted to a diminishing sawtooth. The diminishing sawtooth waveshape is due to the increasing effect of dithering after the leading edge 80 of the burst. As time passes after leading edge 80 the effect of dithering is to increasingly de-correlate the sampled receive signal with time. At point 82 in the lower trace, de-correlation is nearly total. In a typical application such as rangefinding, only the leading edge of the burst is used, which is not diminished by dithering for the first 10% of the burst.

Figure 5B:
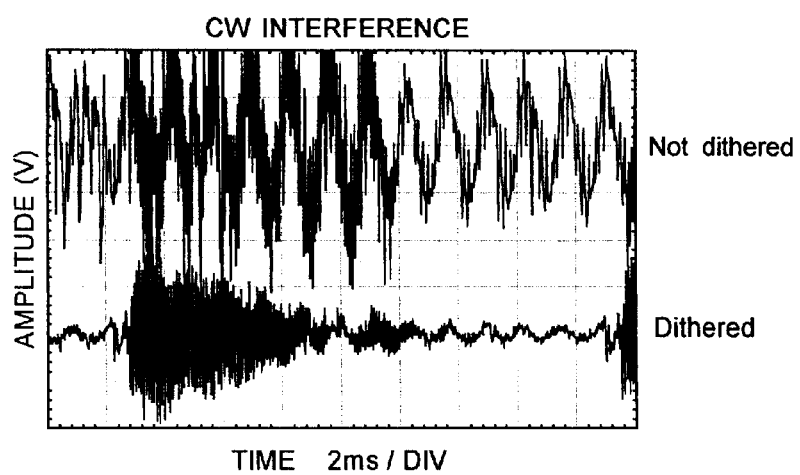
FIG. 5b plots sampled 915 MHz RF bursts with CW interference for dithered and non-dithered clock signals.

FIG. 5b shows the impact of a 10 mW 915 MHz CW interference source on the sampled receive system of FIG. 1a. The interference source antenna is spaced about 0.5 m from receive antenna 18. A large beat frequency pattern can be observed (upper trace) which destroys all functionality. With dither (lower trace), the beat frequency pattern is reduced to the point where nearly normal operation can continue. The beat frequency would be totally eliminated were it not for small imperfections in the present embodiment in the form of imperfect dithering. This imperfection can be seen by the notches at each spectral lobe peak in FIG. 4c. Most likely, some PRF clock signal is contaminating the dither oscillator due to imperfect physical shielding. With careful tuning and component optimization the notches can and have been eliminated.

Dithering, i.e., phase modulation of the PRF clock, substantially improves interference immunity, in addition to substantially reducing the spectral emission peaks for reduced interference to other spectrum users.

Changes and modifications in the specifically described embodiments can be carried out without departing from the scope of the invention which is intended to be limited only by the scope of the appended claims.

What is claimed is:

1. A dithered timing system for use in a pulsed transmitter-receiver system, comprising:
    first and second clock oscillators,
    the first clock oscillator providing a transmit clock signal at a first oscillator frequency to the transmitter,
    the second clock oscillator providing to the receiver a receive clock signal having a frequency that differs by a small offset Δ from the first oscillator frequency,
    a dither source coupled to the inputs of the first and second clock oscillators.

2. The system of claim 1 wherein the dither source comprises a dither oscillator and a clock oscillator coupling network.

3. The system of claim 2 wherein the dither oscillator is a constant-current biased logic inverter having a bypassed input.

4. The system of claim 1 further comprising an offset frequency controller to regulate the offset Δ.

5. The system of claim 1 further comprising a driver following each oscillator to reduce the transition times of the clock signals produced by the first and second clock oscillators.

6. The system of claim 1 wherein each driver comprises an emitter follower having negative impedance in its emitter circuit.

7. An apparatus comprising:
    a transmitter,
    a receiver,
    a timing system comprising:
        first and second clock oscillators,
        the first clock oscillator providing a transmit clock signal at a first oscillator frequency to the transmitter,
        the second clock oscillator providing to the receiver a receive clock signal having a frequency that differs by a small offset Δ from the first oscillator frequency, a dither oscillator coupled to the inputs of the first and second clock oscillators for phase modulating the first and second clock oscillators.

8. The apparatus of claim 7 further comprising an offset frequency controller connected to the second clock oscillator and responsive to a control input to regulate the offset frequency between the first and second clock oscillator.

9. The apparatus of claim 7 wherein the transmitter and receiver comprise an impulse radar, a pulsed RF radar, a pulsed laser, a pulsed radio, a pulsed ultrasonic system or a TDR.

10. A dithered timing system for use in a pulsed transmitter-receiver system, comprising:

a crystal oscillator providing a transmit clock signal to the transmitter, a delay element coupled from the crystal oscillator to the receiver for providing a delayed receive clock signal to the receiver, a dither source coupled to the crystal oscillator.

11. The system of claim 10 wherein the dither source comprises a dither oscillator and a clock oscillator coupling network.

12. The system of claim 11 wherein the dither oscillator is a constant-current biased logic inverter with a bypassed input.

13. The system of claim 10 wherein the delay produced by the delay element is swept over a range of delays via a control port.

14. The system of claim 10 further comprising a pair of drivers wherein the transition times of the transmit and receive clock signals are reduced, each driver comprising an emitter follower having negative impedance in its emitter circuit.

15. An apparatus comprising:

a transmitter, a receiver, a timing system comprising:
    a clock oscillator,
    a delay element;
    a dither oscillator;
    the clock oscillator providing a transmit clock signal to the transmitter,
    the clock oscillator also providing to the receiver a receive clock signal having a delay produced by the delay element,
    the dither oscillator phase modulating the clock oscillator.

16. The apparatus of claim 15 further comprising a control input to the delay element to sweep the delay over a range of delays.

17. The apparatus of claim 15 wherein the transmitter and receiver comprise an impulse radar, a pulsed RF radar, a pulsed laser, a pulsed radio, a pulsed ultrasonic system or a TDR.

* * * * *